US011680649B2

(12) United States Patent
Eichler et al.

(10) Patent No.: US 11,680,649 B2
(45) Date of Patent: Jun. 20, 2023

(54) PROPORTIONAL VALVE SPOOL WITH LINEAR FLOW GAIN

(71) Applicant: Parker-Hannifin Corporation, Cleveland, OH (US)

(72) Inventors: Mitchell P. Eichler, Cleveland, OH (US); Michael Broeckmann, Neuss (DE); Bipin G. Kashid, Avon, OH (US)

(73) Assignee: Parker-Hannifin Corporstion, Cleveland, OH (US)

( * ) Notice: Subject to any disclaimer, the term of this patent is extended or adjusted under 35 U.S.C. 154(b) by 79 days.

(21) Appl. No.: 17/412,439

(22) Filed: Aug. 26, 2021

(65) Prior Publication Data

US 2022/0154834 A1    May 19, 2022

Related U.S. Application Data

(60) Provisional application No. 63/134,219, filed on Jan. 6, 2021, provisional application No. 63/114,032, filed on Nov. 16, 2020.

(51) Int. Cl.
*F16K 11/07* (2006.01)
*F15B 1/26* (2006.01)
(Continued)

(52) U.S. Cl.
CPC ............ *F16K 11/0708* (2013.01); *F15B 1/26* (2013.01); *F15B 13/0402* (2013.01);
(Continued)

(58) Field of Classification Search
CPC .. F16K 11/07; F16K 11/0708; F16K 11/0712; F16K 11/0716; F15B 13/0433;
(Continued)

(56) References Cited

U.S. PATENT DOCUMENTS 2,916,049 A * 12/1959 Ruhl ....................... F16K 11/07
                                                          137/636
3,216,446 A * 11/1965 Schmiel .................. F16K 11/07
                                                        137/625.69
(Continued)

FOREIGN PATENT DOCUMENTS

CN      203258106 U    10/2013
CN      106545667 A    3/2017
(Continued)

OTHER PUBLICATIONS

Extended European Search Report prepared by the European Patent Office in application No. EP 21 19 9724.2 dated Mar. 25, 2022.

*Primary Examiner* — Dustin T Nguyen
(74) *Attorney, Agent, or Firm* — McDonnell Boehnen Hulbert & Berghoff LLP

(57) ABSTRACT

An example spool includes a shaft varying in diameter along a length of the shaft, and a plurality of annular lands formed on the shaft and spaced-apart by respective reduced diameter annular neck portions. The plurality of annular lands comprise at least one annular metering land, and wherein the at least one annular metering land comprises: one or more sine notches formed as a portion of a sine wave, and one or more additional notches having a different shape from the one or more sine notches.

17 Claims, 7 Drawing Sheets

(51) Int. Cl.
*F15B 15/20* (2006.01)
*F15B 13/04* (2006.01)
*F15B 13/00* (2006.01)

(52) U.S. Cl.
CPC .......... *F15B 15/20* (2013.01); *F16K 11/0712* (2013.01); *F15B 2013/008* (2013.01)

(58) Field of Classification Search
CPC ............ F15B 13/0402; F15B 2013/008; E02F 9/2267
See application file for complete search history.

(56) References Cited

U.S. PATENT DOCUMENTS

| | | | | |
|---|---|---|---|---|
| 4,615,358 | A * | 10/1986 | Hammond | .......... F15B 13/0435 137/625.68 |
| 4,862,920 | A * | 9/1989 | Cleasby | .................. F15B 13/04 148/656 |
| 4,941,508 | A * | 7/1990 | Hennessy | ........... F16K 11/0708 251/324 |
| 5,305,789 | A * | 4/1994 | Rivolier | .............. F15B 13/0417 91/518 |
| 5,921,165 | A * | 7/1999 | Takahashi | ............. F15B 13/015 91/461 |
| 5,950,429 | A * | 9/1999 | Hamkins | ............... F15B 11/162 60/426 |
| 6,397,890 | B1 * | 6/2002 | Mickelson | .............. F16K 11/07 137/625.69 |
| 7,882,777 | B2 * | 2/2011 | Matsuzaki | .......... F15B 13/0402 91/446 |
| 10,215,292 | B2 | 2/2019 | Guarino | |
| 10,508,746 | B2 * | 12/2019 | Cis | ..................... F16K 11/0708 |
| 10,816,099 | B2 | 10/2020 | Lauer et al. | |
| 11,009,051 | B2 * | 5/2021 | Biwersi | ............. F15B 13/0402 |
| 11,408,520 | B2 * | 8/2022 | Igaki | ......................... B66F 9/10 |
| 2019/0390690 | A1 | 12/2019 | Biwersi et al. | |

FOREIGN PATENT DOCUMENTS

| | | |
|---|---|---|
| DE | 10 2008 059434 B3 | 1/2010 |
| DE | 10 2013 014671 A1 | 3/2015 |
| DE | 102016220855 A1 | 4/2018 |
| EP | 0 015 955 A1 | 10/1980 |
| EP | 0 200 182 A2 | 11/1986 |
| EP | 0 301 726 A1 | 2/1989 |
| EP | 0 581 156 A2 | 2/1994 |
| WO | 2009/062563 A1 | 5/2009 |

* cited by examiner

PROPORTIONAL VALVE SPOOL WITH LINEAR FLOW GAIN

CROSS REFERENCE TO RELATED APPLICATION

The present application claims priority to U.S. Provisional Application No. 63/114,032 filed on Nov. 16, 2020 and U.S. Provisional Application No. 63/134,219 filed on Jan. 6, 2021, the entire contents of all of which are herein incorporated by reference as if fully set forth in this description.

BACKGROUND

Hydraulic machinery commonly includes one or more valves. A valve can include a spool that is operated in response to the input command to control fluid flow and pressure to a hydraulic actuator of the machinery. The hydraulic actuator can have two chambers, and the valve controls fluid flow from a source of fluid to one chamber of the hydraulic actuator as well as fluid flow from the other chamber of the actuator to a fluid reservoir.

When the valve is actuated, the spool shifts or moves axially within a bore in a valve body of the valve. As the spool moves, a variable area orifice is formed between a metering edge of the spool and the inner surface of the valve body. The size of the area of such variable area orifice depends on the extent of axial motion of the spool and the shape of the metering edge of the spool.

The shape and size of the variable area orifice controls the flow gain of the spool, where the flow gain is the change of fluid flow rate for a given axial movement of the spool. In some applications, it may be desirable to have a substantially-linear flow gain such that movement of the hydraulic actuator controlled by the valve is predictable. It is with respect to these and other considerations that the disclosure made herein is presented.

SUMMARY

The present disclosure describes implementations that relate to a proportional valve spool with linear flow gain.

In a first example implementation, the present disclosure describes a spool configured to be movable in a longitudinal bore of a valve. The spool includes: a shaft varying in diameter along a length of the shaft; and a plurality of annular lands formed on the shaft and spaced-apart by respective reduced diameter annular neck portions, wherein the plurality of annular lands comprise at least one annular metering land, and wherein the at least one annular metering land comprises: one or more sine notches formed as a portion of a sine wave, and one or more additional notches having a different shape from the one or more sine notches.

In a second example implementation, the present disclosure describes a valve. The valve includes a valve body having (i) a longitudinal bore, (ii) a workport passage configured to be fluidly coupled to a hydraulic actuator, and (iii) a supply cavity configured to receive fluid from a source of fluid; and a spool axially movable in the longitudinal bore between a neutral position and a shifted position. The spool includes: a shaft varying in diameter along a length of the shaft, and a plurality of annular lands formed on the shaft and spaced-apart by respective reduced diameter annular neck portions, wherein the plurality of annular lands comprise at least one annular metering land. The at least one annular metering land comprises: one or more sine notches formed as a portion of a sine wave, and one or more additional notches having a different shape from the one or more sine notches. As the spool moves from the neutral position to the shifted position, the one or more sine notches and the one or more additional notches engage the workport passage to allow fluid flow from the supply cavity to the workport passage.

In a third example implementation, the present disclosure describes a hydraulic system including a source of fluid; a fluid reservoir; a hydraulic actuator having a first chamber and a second chamber therein; and a valve. The valve includes: a valve body having (i) a longitudinal bore, (ii) a first workport passage fluidly coupled to the first chamber of the hydraulic actuator, (iii) a second workport passage fluidly coupled to the second chamber of the hydraulic actuator, (iv) a supply cavity fluidly coupled to the source of fluid, and (v) a return cavity fluidly coupled to the fluid reservoir, and a spool axially movable in the longitudinal bore between a neutral position and a shifted position. The spool includes: (i) a shaft varying in diameter along a length of the shaft, (ii) a first annular metering land formed on the shaft, and (iii) a second annular metering land formed on the shaft, wherein the first annular metering land and the second annular metering land each has a plurality of notches comprising: one or more sine notches formed as a portion of a sine wave, and one or more additional notches having a different shape from the one or more sine notches, wherein as the spool moves from the neutral position to the shifted position, the plurality of notches of the first annular metering land engage the first workport passage to allow fluid flow from the supply cavity to the first workport passage, and the plurality of notches of the second annular metering land engage the second workport passage to allow fluid flow from the second workport passage to the return cavity.

In a fourth example implementation, the present disclosure describes a method for making a spool configured to be movable in a longitudinal bore of a valve. The method includes: (i) providing a shaft of the spool; (ii) forming a plurality of annular lands on the shaft such that the plurality of annular lands are spaced-apart by respective reduced diameter annular neck portions, wherein the plurality of annular lands comprise at least one annular metering land; (iii) forming one or more sine notches shaped as a portion of a sine wave; and (iv) forming one or more additional notches having a different shape from the one or more sine notches.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1A:
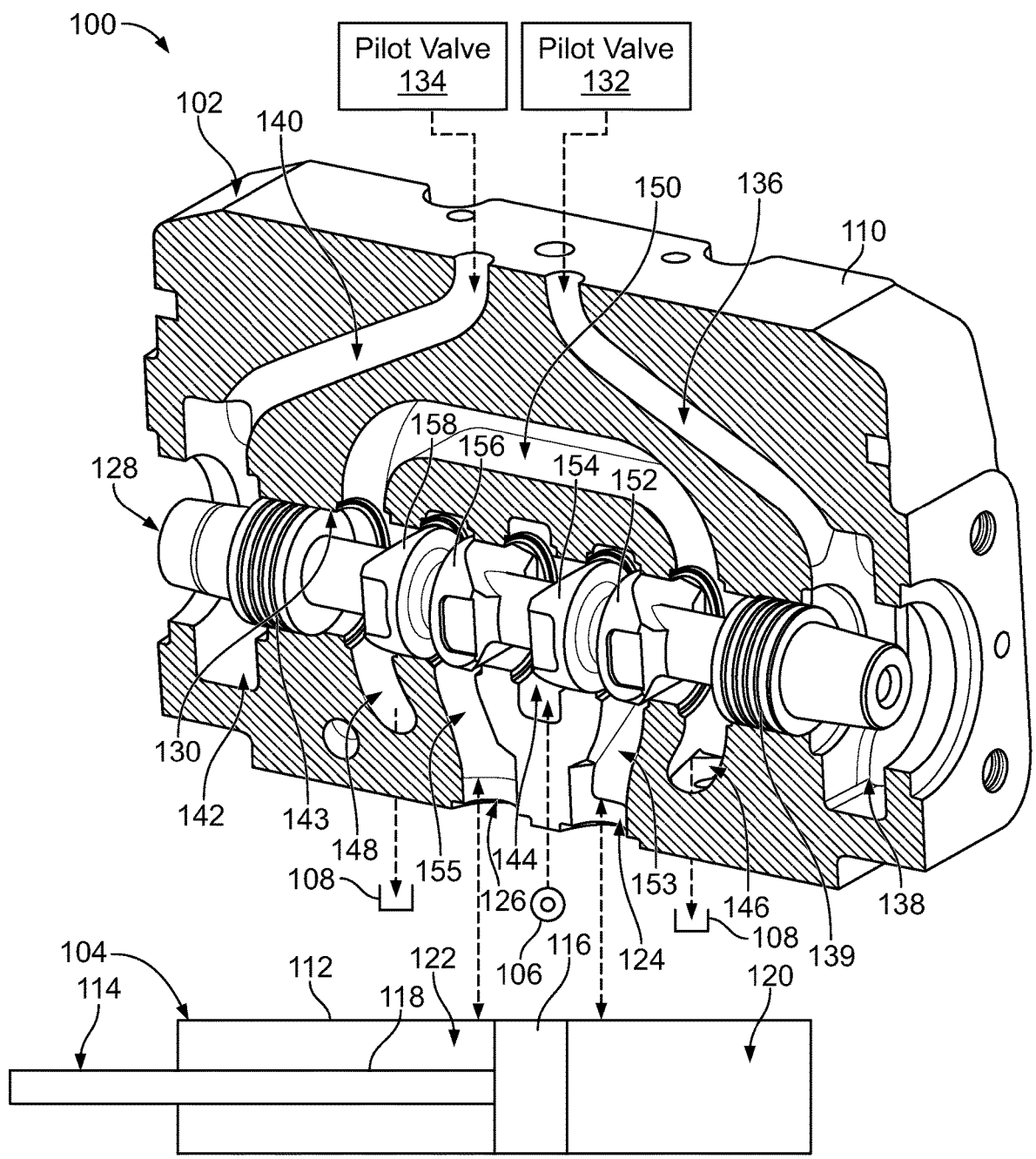
FIG. 1A illustrates a partial, schematic representation of a hydraulic system having a valve, in accordance with an example implementation.

Hydraulic fluid flow in a hydraulic machine can be controlled using hydraulic control valves. A valve can include a valve body or housing having internal fluid passages, external ports, and a valve bore with a spool slidably-disposed within the valve bore. The valve is configured to control flow of fluid to and from a hydraulic actuator of the hydraulic machine.

The spool of the valve includes portions of differing diameter, such as a relatively smaller diameter portion (e.g., a neck portion) that acts as a flow area permitting flow of fluid across the spool, and a relatively larger diameter portion referred to as a land that restricts or blocks the flow of fluid across the spool, thereby controlling the flow of fluid through the valve. The spool can have a plurality of lands that interface with inner surfaces of the valve body to control fluid flow.

Particularly, the land can have an edge that can be referred to as a metering edge, and when the valve is actuated and the spool shifts within the spool bore a variable area orifice is formed between the metering edge and the inner surface of the valve body. The variable area orifice allows fluid flow therethrough. As the spool moves axially within the valve bore, the variable area of the orifice changes, thereby changing the fluid flow rate. The flow gain of the valve, i.e., the change in fluid flow rate through the valve for a given axial movement of the spool within the valve bore, is determined based on the change in the area of the orifice as the spool moves axially.

The spool can include one or more metering notches formed in the land, and such metering notches are configured to control fluid flow from a source of fluid into a downstream flow passage. The shape, depth, and number of the metering notches determine the flow gain of the spool.

In some applications, it may be desirable to have a substantially-linear flow gain such that movement of the hydraulic actuator controlled by the valve is predictable. Such substantially-linear flow characteristics may also provide for easier controller tuning. A nonlinear flow gain indicates that a given axial movement distance of the spool corresponds to a different amount of change in fluid flow rate based on where the spool is in its stroke. In other words, the flow rate through the valve versus the axial movement of the spool follows a nonlinear curve. In contrast, a linear flow gain indicates that the change in fluid flow rate versus the axial movement of the spool follows a substantially-straight line. Particularly, for a given axial distance of spool movement, the change in the fluid flow rate is consistent regardless of where the spool is in its stroke. Throughout this disclosure, the term "substantially-linear flow gain" indicates that the fluid flow rate of the valve versus the stroke of the spool follows a substantially-straight line, such that the flow rate can deviate from the line by no more than a threshold value (e.g., between 2% and 5% of maximum flow).

In one example, complex-shaped notches can be formed in the land to achieve a linear flow gain. Such complex notches can be formed in the spool via expensive machining techniques such as electrical discharge machining (EDM). Such manufacturing techniques can be costly. It may thus be desirable to have a spool that can achieve a substantially-linear flow gain using simpler notch shapes that are not complex to machine.

Disclosed herein are spools, valves, and systems that achieve substantially-linear flow gain. Particularly, an example spool has at least one annular metering land comprising one or more sine notches and one or more additional notches that have a different shape (e.g., generally square or triangular notches) from the at least one sine notch. The combination of the sine notch and the additional notch can achieve linear flow characteristics as described below.

FIG. 1A illustrates a partial, schematic representation of a hydraulic system 100, in accordance with an example implementation. FIG. 1A particularly illustrates a partial, perspective cross-sectional view of a valve 102 that is configured to control movement of a hydraulic actuator 104 by controlling fluid flow to and from the hydraulic actuator 104.

The hydraulic system 100 includes a source 106 of fluid. The source 106 of fluid can be a pump (e.g., fixed displacement, variable displacement pump, a load-sense variable displacement pump, etc.), or an accumulator, as examples. A pump can receive fluid from a fluid tank or fluid reservoir 108 of the hydraulic system 100, and the source 106 then pushes the fluid to the valve 102.

The valve 102 has a valve body 110 that defines multiple fluid passages, cavities, and bores therein. Such fluid passages, cavities, and bores are fluidly coupled to various components of the hydraulic system 100 such as the source 106, the fluid reservoir 108, and the hydraulic actuator 104.

In the example implementation of FIG. 1A, the hydraulic actuator 104 includes a cylinder 112 and a piston 114 slidably accommodated within the cylinder 112. The term "slidably accommodated" is used throughout herein to indicate that a first component (e.g., the piston 114) is positioned relative to a second component (e.g., the cylinder 112) such that the first component is able to move relative to the second component.

The piston 114 includes a piston head 116 and a piston rod 118 extending from the piston head 116 along a central longitudinal axis direction of the cylinder 112. The piston head 116 divides the inside or internal space of the cylinder 112 into a chamber 120 and a chamber 122. The chamber 120 can be referred to as a cap chamber or head chamber, whereas the chamber 122 can be referred to as a rod chamber.

The valve 102 includes a workport 124 that is fluidly coupled (e.g., via a fluid lines such as a hose or tube) to the chamber 120 of the hydraulic actuator 104, and the valve 102 also includes a workport 126 that is fluidly coupled to the chamber 122 of the hydraulic actuator 104. Fluid lines are represented in FIG. 1A with dashed arrows. The valve 102 is configured to control supply fluid flow from the source 106 to the workports 124, 126, and control return fluid flow from the workports 124, 126 to the fluid reservoir 108.

The valve 102 has a spool 128 slidably accommodated (i.e., axially movable) in a longitudinal bore 130 formed in the valve body 110. The spool 128 can be configured to be biased to a neutral or centered position by springs (not shown) disposed at the ends of the spool 128.

Figure 1B:
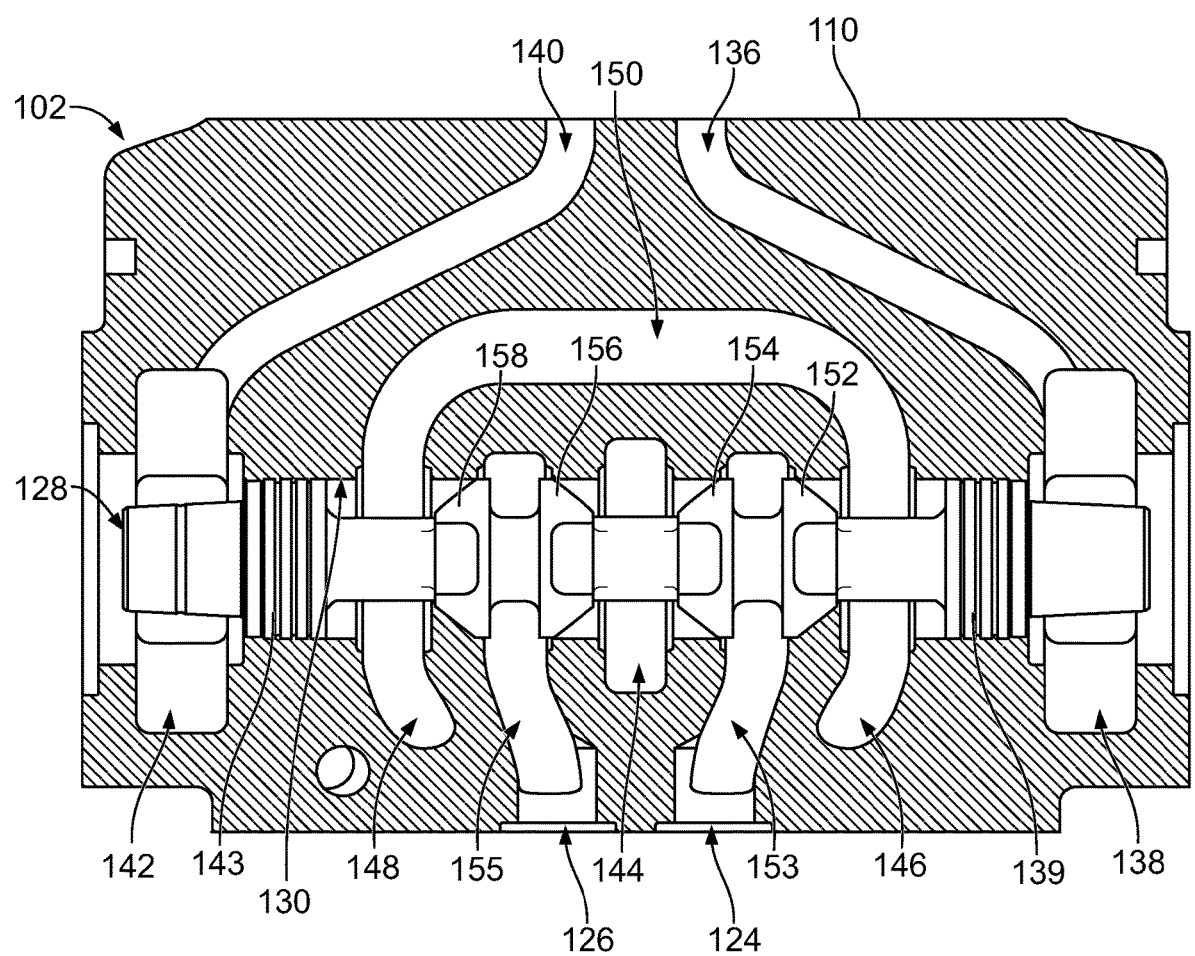
FIG. 1B illustrates a cross-sectional view of the valve shown in FIG. 1A, in accordance with an example implementation.

FIG. 1B illustrates a cross-sectional view of the valve 102 shown in FIG. 1A, in accordance with an example implementation. FIG. 1B shows the spool 128 in a neutral position. When the spool 128 is in a neutral position, the spool 128 blocks fluid flow from the source 106 to the workports 124, 126. The term "block" is used throughout herein to indicate substantially preventing fluid flow except for minimal or leakage flow of drops per minute, for example.

The spool 128 can be actuated in either direction from the neutral position via various types of mechanisms. As an example for illustration, the spool 128 can be controlled by pilot valves such as pilot valves 132, 134 shown as blocks in FIG. 1A.

In an example, the pilot valves 132, 134 are solenoid-operated. In one example, the pilot valves 132, 134 can be configured as pressure reducing valves that receive pressurized fluid from the source 106 then generate a pilot fluid signal that is proportional to a magnitude of an electric command provided to a respective solenoid of the pilot valves 132, 134. In another example, the pilot valves 132, 134 are hydro-mechanical valves that are manually controlled by joysticks or levers to provide the pilot fluid signal.

When actuated, the pilot valve 132 provides the pilot fluid signal to a pilot fluid passage 136 that communicates the pilot fluid signal to a first pilot cavity 138 at a first end of the spool 128. The pilot fluid signal in the first pilot cavity 138 applies a fluid force on a pilot land 139 of the spool 128 to shift the spool 128 in a first direction (to the left in FIG. 1A).

The pilot valve 134 can be configured similar to the pilot valve 132 and is configured to provide, when actuated, a pilot fluid signal to a pilot fluid passage 140 that communicates the pilot fluid signal to a second pilot cavity 142 at a second end of the spool 128. The pilot fluid signal in the second pilot cavity 142 applies a fluid force on a pilot land 143 the spool 128 to shift the spool 128 in a second direction (to the right left in FIG. 1A) opposite the first direction.

Supply fluid provided from the source 106 is provided through an inlet port of the valve 102 to a supply cavity 144 formed within the valve body 110 of the valve 102. When the spool 128 moves axially in either direction, a variable metering orifice is formed as described below to allow fluid to flow from the supply cavity 144 to one of the workports 124, 126.

The spool 128 varies in diameter along its length to form annular metering lands separated by respective reduced diameter annular neck portions (also referred to as undercuts), thereby selectively interconnecting the various passages intercepting the longitudinal bore 130 to control flow of fluid to and from the workports 124, 126 as the spool 128 shifts axially. The term "annular metering land" is used herein to indicate a generally cylindrical spool body portion having a larger diameter compared to the reduced diameter annular neck portions that separate the lands from each other. The annular metering lands of the spool 128 cooperate with internal surfaces of the valve body 110 to define variable metering orifices that allow fluid flow therethrough. For example, the spool 128 has annular metering land 152, annular metering land 154, annular metering land 156, and annular metering land 158 configured to cooperate with the internal surfaces of the valve body 110 to form the variable metering orifices and control the fluid flow rate and direction through the valve 102. The annular metering lands 152-158 each has a first diameter, and they are separated from each other by reduced diameter annular neck portions having a second diameter that is smaller than the first diameter. With this configuration, annular grooves are formed between each two adjacent annular metering lands of the annular metering lands 150-158.

Each land of the annular metering lands 152-158 can block a respective fluid passage in the valve body 110 when the spool 128 is in the neutral position shown in FIG. 1B. As the spool 128 shifts, a metering edge of a subset of the annular metering lands 152-158 moves past an edge of a respective internal surface bounding a fluid passage in the valve body 110 to form a variable metering orifice. The term "variable metering orifice" is used herein to indicate a spool-to-bore cylindrical area opening that forms between an annular metering land of the spool 128 and the internal surfaces of the valve body 110 when the spool 128 shifts axially therein. Thus, the variable metering orifice is a flow area that forms between the spool 128 and the internal surface of the valve body 110, and the flow area varies in size based on the axial position of the spool 128 within the longitudinal bore 130, e.g., the farther the spool 128 shifts axially, the larger the flow area.

The valve 102 has a return cavity 146 and a return cavity 148 that are fluidly coupled to each other via fluid passage 150 and are both fluidly coupled to the fluid reservoir 108. The fluid reservoir 108 is drawn in two locations on FIG. 1A to reduce visual clutter but it should be understood that the return cavities 146, 148 are fluidly coupled to an outlet port of the valve 102, and the outlet port is fluidly coupled to the fluid reservoir 108.

The valve 102 has a workport passage 153 that is fluidly coupled to the workport 124. The valve 102 also has a workport passage 155 that is fluidly coupled to the workport 126. When the spool 128 is in the neutral position shown in FIG. 1B, fluid flow to the various cavities and passages can be blocked. Particularly, the annular metering land 154 blocks fluid flow from the supply cavity 144 to the workport passage 153, the annular metering land 156 blocks fluid flow from the supply cavity 144 to the workport passage 155, the annular metering land 152 blocks fluid flow from the workport passage 153 to the return cavity 146, and the annular metering land 158 blocks fluid flow from the workport passage 155 to the return cavity 148. As such, the piston 114 of the hydraulic actuator 104 might not move when the spool 128 is in the neutral position.

Referring to FIG. 1A, actuating the pilot valve 132 or pilot valve 134 causes the spool 128 to move axially, thereby providing fluid flow to the hydraulic actuator 104 to move the piston 114. For instance, if the pilot valve 132 is actuated and the spool 128 shifts axially to the left in FIG. 1A, the annular metering land 156 can move to the extent that it moves past an edge of the internal surface of the valve body 110 interfacing therewith. As a result, a metering orifice is formed (as depicted in FIG. 1A), allowing fluid flow from supply cavity 144 to the workport passage 155.

The workport passage 155 is fluidly coupled to the workport 126, and thus fluid flows through the workport passage 155 to the workport 126, and then to the chamber 122 of the hydraulic actuator 104 to retract the piston 114 (e.g., move the piston 114 to the right in FIG. 1A). Fluid discharged from the chamber 120 of the hydraulic actuator 104 flows through the workport 124 and the workport passage 153, then through another metering orifice formed between the annular metering land 152 and the internal surface of the valve body 110 (as depicted in FIG. 1A) to the return cavity 146, which is fluidly coupled to the fluid reservoir 108.

On the other hand, if the pilot valve 134 is actuated and the spool 128 shifts axially to the right in FIG. 1A, the annular metering land 154 can move to the extent that it moves past an edge of the internal surface of the valve body 110 interfacing therewith. As a result, a metering orifice is formed, allowing fluid flow from the supply cavity 144 to the workport passage 153. The workport passage 153 is fluidly coupled to the workport 124, and thus fluid flows through the workport passage 153 to the workport 124, and then to the chamber 120 of the hydraulic actuator 104 to extend the piston 114 (e.g., move the piston 114 to the left in FIG. 1A). Fluid discharged from the chamber 122 of the hydraulic actuator 104 flows through the workport 126 and the workport passage 155, then through another metering orifice formed between the annular metering land 158 and the internal surface of the valve body 110 to the return cavity 148, which is fluidly coupled to the fluid reservoir 108.

In some applications, it may be desirable to have a linear relationship between axial movement of the spool 128 and the amount of fluid flow rate provided to or from a workport of the workports 124, 126. Such linearity may render the performance of the valve 102 predictable. It may thus be desirable to configure the spool 128 to provide such linear relationship between its axial movement and the amount of fluid flow rate provided to and from the workports 124, 126. It may also be desirable to configure the spool 128 as such in a cost-effective way that does not involve expensive manufacturing techniques such as EDM.

Figure 2A:
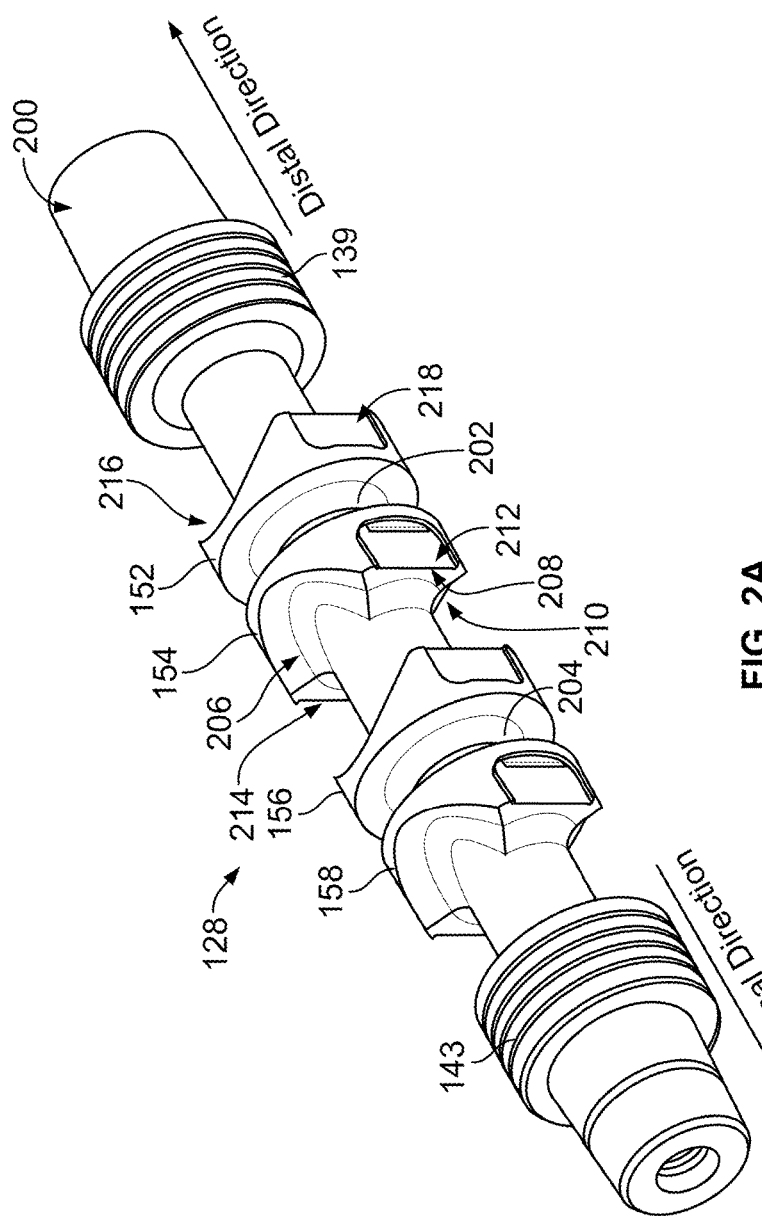
FIG. 2A illustrates a perspective view of a spool of the valve shown in FIGS. 1A-1B, in accordance with an example implementation.
Figure 2B:
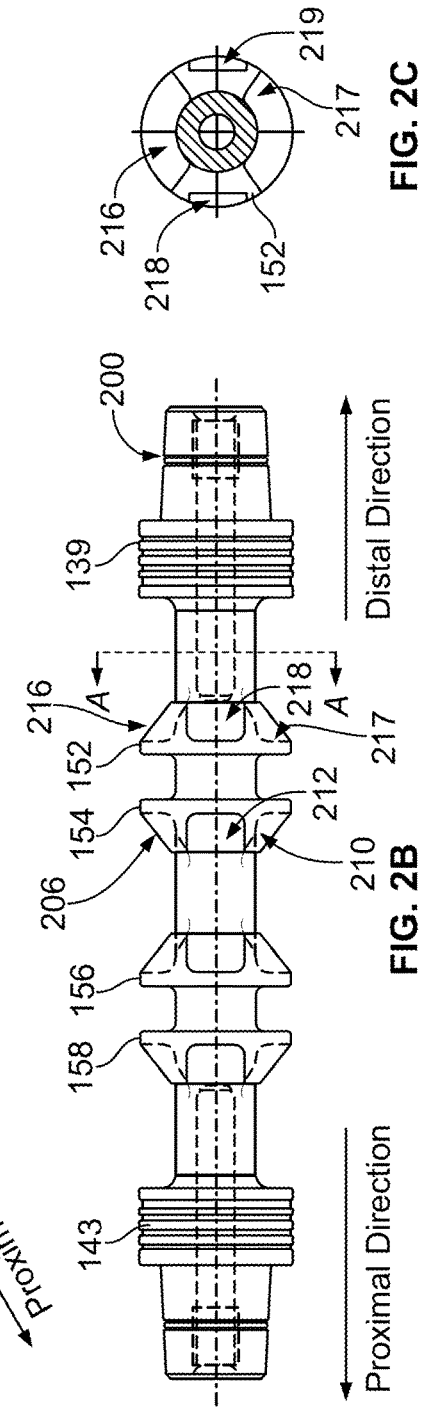
FIG. 2B illustrates a side elevational view of the spool of FIG. 2A, in accordance with an example implementation.
Figure 2C:
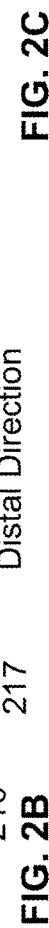
FIG. 2C illustrates a cross-sectional view of the spool taken along section line A-A shown in FIG. 2B, in accordance with an example implementation.

FIG. 2A illustrates a perspective view of the spool 128, FIG. 2B illustrates a side elevational view of the spool 128, FIG. 2C illustrates a cross-sectional view of the spool 128 taken along section line A-A shown in FIG. 2B, in accordance with an example implementation. The spool 128 has a cylindrical spool body or shaft 200 that varies in diameter along its length to form the pilot lands 139, 143 and the annular metering lands 152-158 separated by reduced diameter neck portions as described above. Particularly, the annular metering lands 152, 154 form a first pair of opposed annular lands formed on the shaft 200 and spaced-apart by a first reduced diameter annular neck portion 202. Similarly, the annular metering lands 156, 158 form a second pair of opposed annular lands formed on the shaft 200 and spaced-apart by a second reduced diameter annular neck portion 204.

Each of the annular metering lands 152-158 has a first plurality of notches formed as a portion of a sine wave and a second plurality of notches having a different shape disposed in a circular array about a circumference of the annular metering land. In an example, the first plurality of notches are interleaved with the second plurality of notches about a circumference of the respective annular land. As a particular example, each annular land can have a pair of sine notches and a pair of notches that have a different shape, e.g., having a generally square-shaped notch.

The term "plurality of notches" is used herein to indicate one or more notches. The term "sine notch" is used herein to refer to notch shaped as a portion of a geometric sine waveform formed along a portion of a meter edge of an annular metering land. Also, the term "interleaved" is used here to indicate that one of the sine notches is circumferentially-interposed between two notches having a different shape (i.e., are not shaped as sine notches), and similarly, each of the notches having the different shape is circumferentially-interposed between two sine notches.

For example, the annular metering land 154 has two sine notches and two additional notches having a different shape. Particularly, the annular metering land 154 has a first sine notch 206 formed in a proximal metering edge 208 of the annular metering land 154 and has a second sine notch 210 formed in the proximal metering edge 208 diametrically-opposite from the first sine notch 206.

The annular metering land 154 further has a first square notch 212 circumferentially-interposed between the first sine notch 206 and the second sine notch 210. The annular metering land 154 also has a second square notch 214 diametrically-opposite from the first square notch 212 and interposed circumferentially between the first sine notch 206 and the second sine notch 210.

The annular metering land 152 is configured similar to the annular metering land 154, with the respective sine notches being formed in the distal metering edge rather than a proximal metering edge. In other words, the notches of the annular metering land 152 face in an opposite direction compared to the notches of the annular metering land 154. For example, the annular land 152 has a first sine notch 216, a second sine notch 217, a first square notch 218, and a second square notch 219 (shown in FIG. 2C). The other pair of annular metering lands, i.e., the annular metering lands 156, 158, is configured similar to the annular metering lands 152, 154.

Advantageously, sine notches can be formed in a cost-effective manner, e.g., via milling. Further, sine notches are characterized by having a large flow area gradient versus axial movement of the spool 128. In other words, a small stroke or axial movement of the spool 128 exposes a large flow metering area due to the geometric shape of a sine notch. However, having the sine notches by themselves, i.e., the sine notches 206, 210 without the square notches 212, 214, might not be sufficient to provide linear flow relationship.

Figure 3:
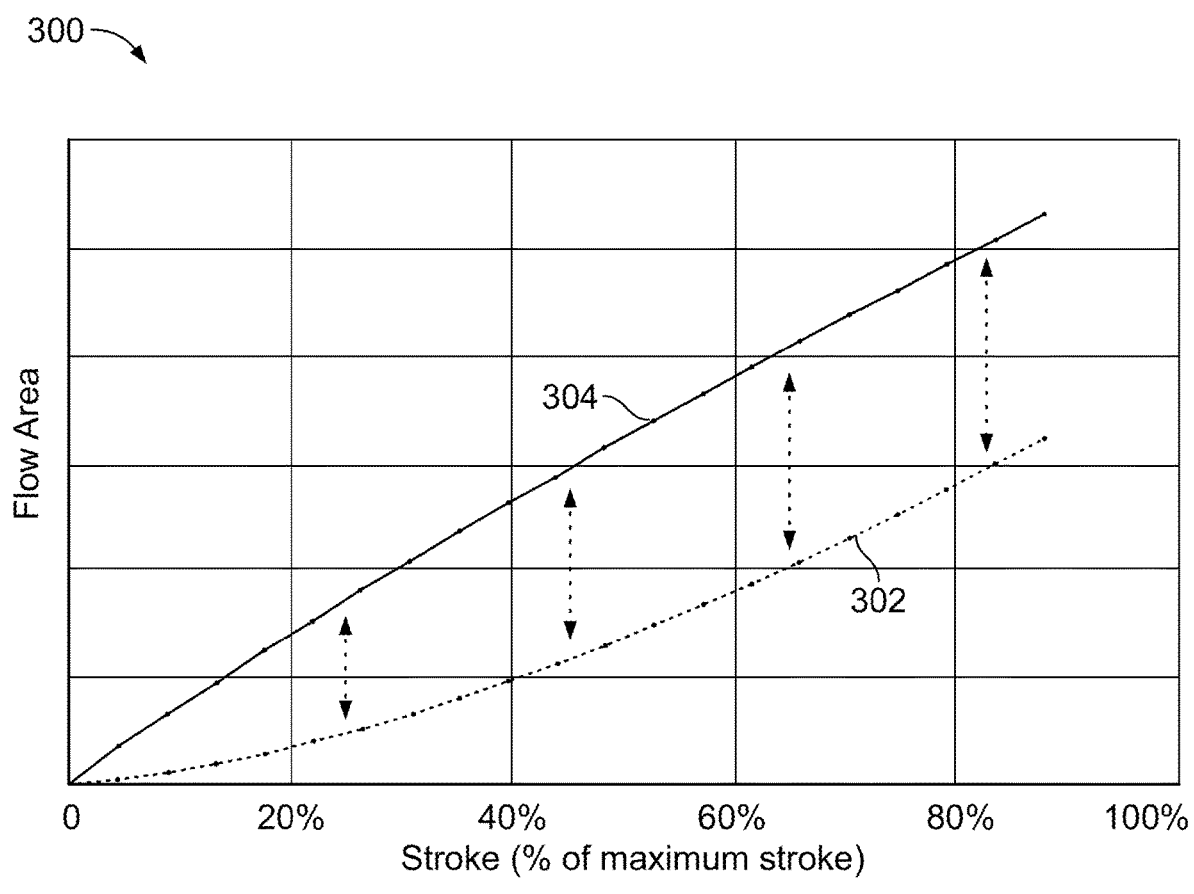
FIG. 3 illustrates a graph showing flow area characteristics of a spool with sine notches compared to substantially-linear flow area characteristics, in accordance with an example implementation.

FIG. 3 illustrates a graph 300 showing flow area characteristics of a spool with sine notches compared to substantially-linear flow area characteristics. The y-axis in the graph 300 represents flow area through a spool and the x-axis represents axial movement or stroke of the spool as a percentage of maximum stroke. Line 302 represents variation in flow area versus stroke of the spool. As an example, the line 302 may represents variation in flow area formed between sine notches similar to the sine notches 206, 210 and the internal surfaces of the valve body 110 (assuming the annular metering land 154 only has the sine notches 206, 210 without the square notches 212, 214) as the spool 128 moves axially in the distal direction. Line 304 represents substantially-linear variation in a flow area versus the stroke of a spool and is used to benchmark linearity of the spool associated with the line 302. Notably, only a portion of a stroke (e.g., from 0% to 40% of maximum stroke) of the spool is plotted in the graph 300.

As depicted, a spool with just sine notches as represented by the line 302 does not provide linear flow characteristics as represented by the line 304. Vertical dashed arrows depicted in the graph 300 represent the additional flow area required to make up for the difference between the line 304 and the line 302. Advantageously, while some conventional spools have many notches disposed about the entire circumference of a land of the spool to provide a particular flow area, a sine notch can provide the same flow area without occupying the entire circumference of the land. As such, there is enough room along a circumference of the land to form additional notches, such as the square notches 212, 214, and provide additional flow area that can make up for the flow area difference between the line 304 and the line 302. Particularly, the geometry of the additional notches, e.g., the square notches 212, 214, can be adjusted in a "tuning" process to provide the appropriate amount of additional flow area such that the spool 128 provides a linear flow gain as the spool 128 moves axially within the valve body 110.

Figure 4:
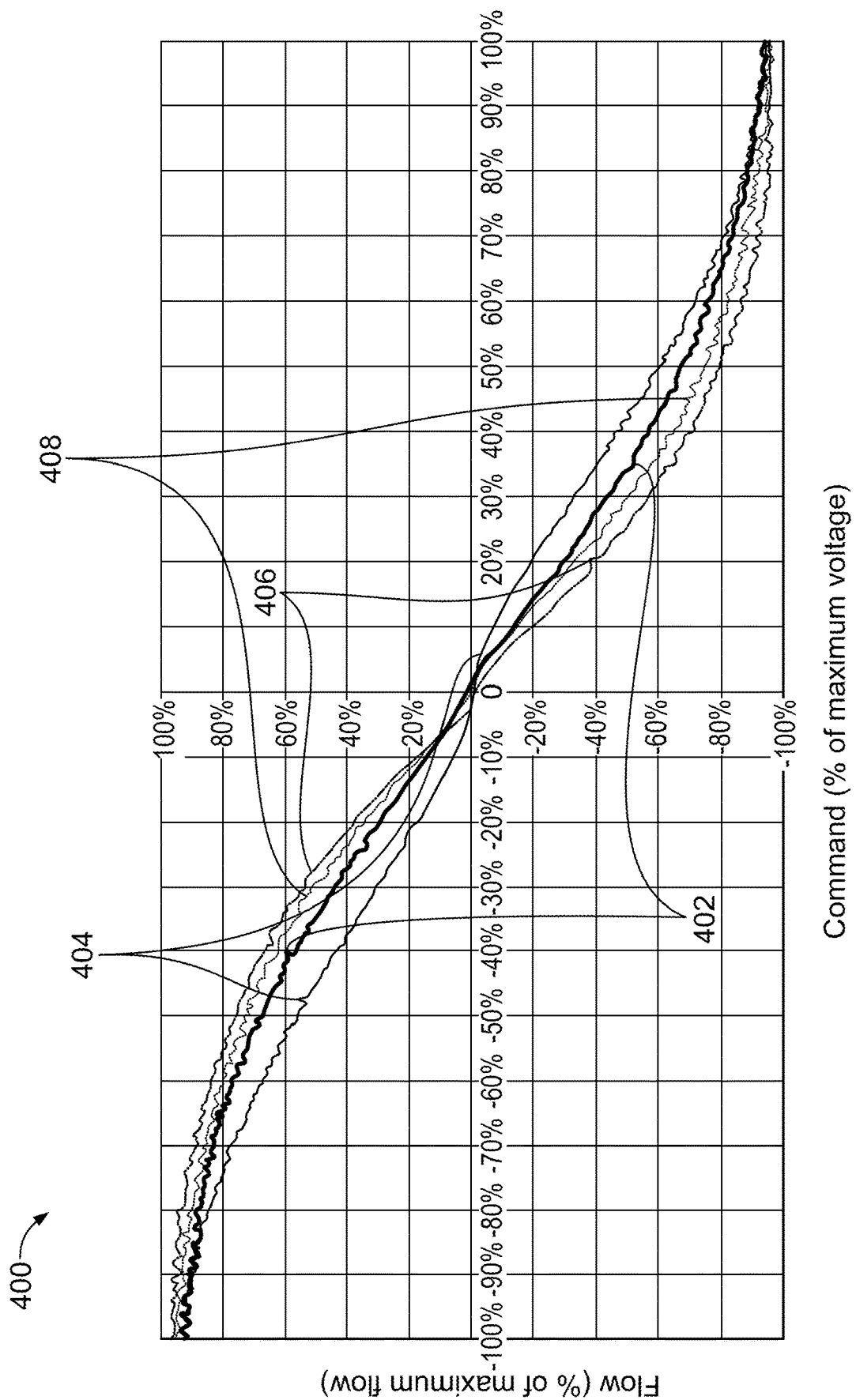
FIG. 4 illustrates a graph showing flow characteristics of different spools, in accordance with an example implementation.

FIG. 4 illustrates a graph 400 showing flow characteristics of different spools. The y-axis in the graph 400 represents flow rate as a percentage of maximum flow rate for a particular pump flow capacity and the x-axis represents commanded voltage to a solenoid that actuates the spool as a percentage of maximum command. A positive voltage indicates a voltage to a first solenoid that, when actuated, moves the spool in a given direction allowing flow from an actuator to the fluid reservoir through the valve (i.e., negative flow), whereas and a negative voltage indicates a voltage to a second solenoid that, when actuated, moves the spool in an opposite direction allowing flow from the source of fluid to the actuator through the valve (i.e., positive flow).

The graph 400 illustrates experimental results of flow gain characteristics for various spool configurations. Particularly, the graph 400 has four line plots corresponding to four different spool configurations. Line 402 represents a benchmark spool having substantially-linear flow characteristics. For example, the benchmark spool may be an expensive spool that can provide substantially-linear flow. Line 404 represents a spool that has sine notches only, without additional notches, and providing non-linear flow characteristics. For example, the line 404 can correspond to the spool associated with the line 302 of FIG. 3.

Figure 5:
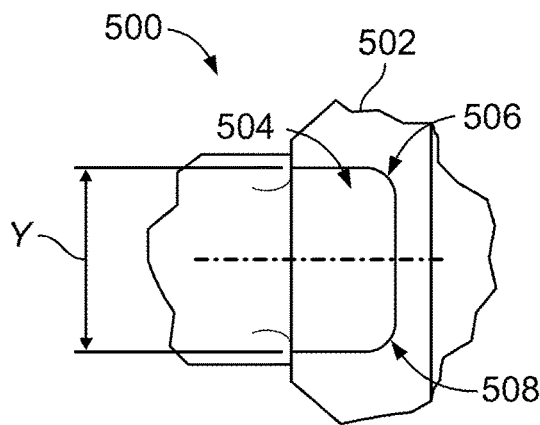
FIG. 5 illustrates a partial view of a spool associated with a line in FIG. 4 showing flow characteristics of the spool, in accordance with an example implementation.
Figure 6:
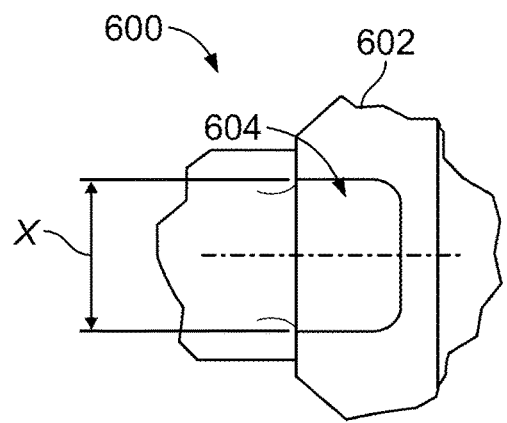
FIG. 6 illustrates a partial view of a spool associated with a line in FIG. 4 showing flow characteristics of the spool, in accordance with an example implementation.

Lines 406, 408 represent respective spools that having sine notches as well as additional notches to make up for the flow difference between the line 402 and the line 404. FIG. 5 illustrates a partial view of a spool 500 associated with line 406, and FIG. 6 illustrates a partial view of a spool 600 associated with line 408, in accordance with example implementations. The spools 500, 600 are variations of the spool 128. Notably, in the graph 400, flow rate tapers off near the end of stroke (i.e., at maximum command) due to the maximum available pump flow used in the experiments, and is not due to the geometry of the spools. Flow rates would be expected to continue with a greater pump flow.

Referring to FIGS. 5-6, in addition to respective sine notches, the spool 500 has an annular metering land 502 (e.g., representing the annular metering land 154) having a square notch 504 with a width Y, whereas the spool 600 has an annular metering land 602 (e.g., representing the annular metering land 154) having a square notch 604 with a width X. As illustrated by FIGS. 5-6, Y is greater than X.

As illustrated by the lines 406, 408 in FIG. 4, the spools 500, 600 provide make up flow relative to the spool associated with the line 404. However, the line 406 indicates that the width Y is larger than required and the make-up flow rate of the spool 500 is larger than the amount required to match the benchmark spool represented by the line 402. The line 408 of the spool 600 with the smaller width X is closer to the line 402 of the benchmark spool. As such, the graph 400 illustrates that the width or other geometric characteristics of the square notch can be "tuned" to provide substantially-linear flow characteristics similar to the line 402. For instance, a third width Z that is smaller than X might move the flow curve even closer to the line 402 of the benchmark spool.

The square notches 212, 218, 219, 504, 604 described above can be referred to as "generally" square notches as they may have radiuses at respective corners. For example, as shown in FIG. 5, the square notch 504 has corners with radii 506, 508 as opposed to sharp corners. Further, while the notches added to the sine spool to make up for the flow difference and achieve substantially-linear flow characteristics are shown and described as square notches, other geometries can be used to provide a linear flow gain.

Figure 7:
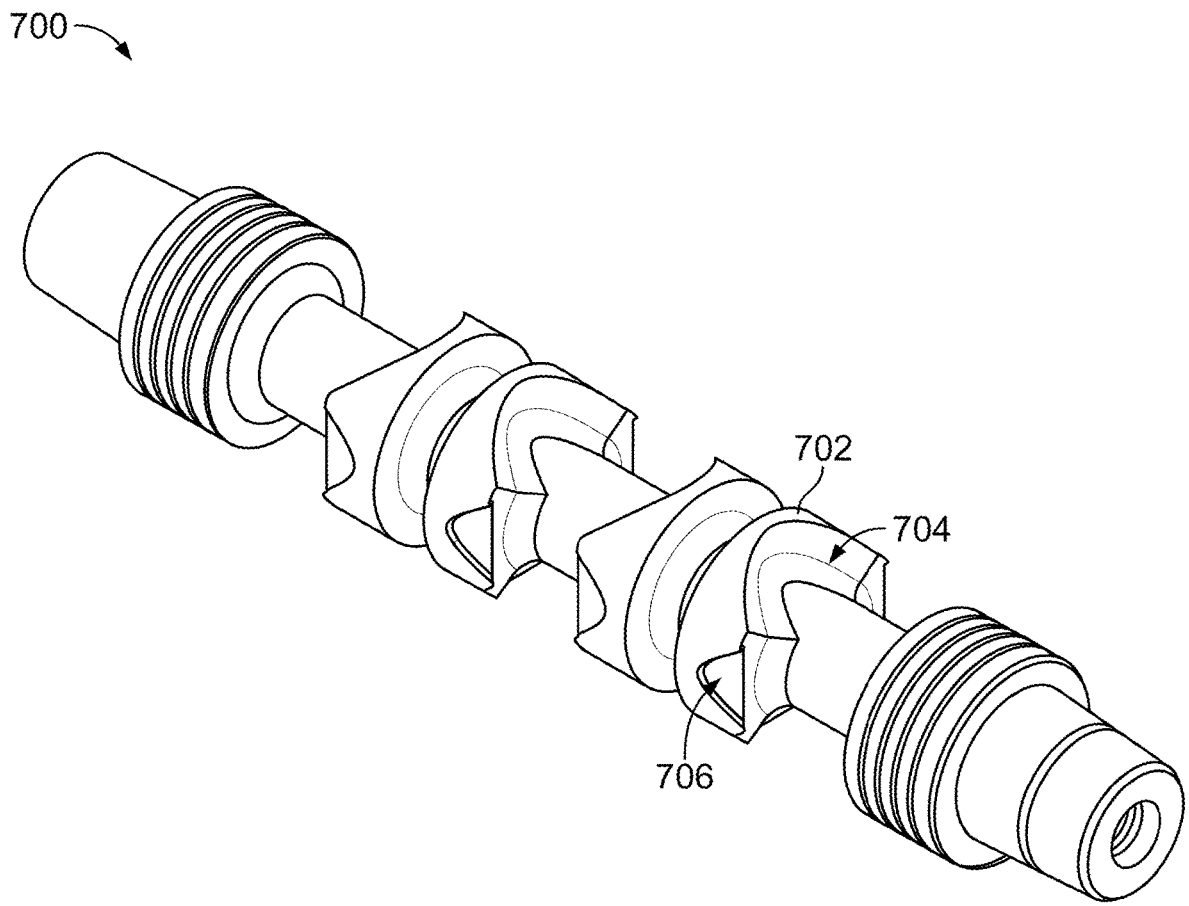
FIG. 7 illustrates a perspective view of a spool having sine notches and triangular notches, in accordance with an example implementation.

FIG. 7 illustrates a perspective view of a spool 700 having sine notches and triangular notches, in accordance with an example implementation. The spool 700 is similar to the spool 128 in that it has four annular metering lands having sine notches. The spool 700 differs from the spool 128 in that the metering lands have additional notches that are generally triangular as opposed to being generally square.

For example, annular metering land 702 has a sine notch 704 (and a corresponding sine notch diametrically-opposite from the sine notch 704) and has a triangular notch 706. In an example, the annular metering land 702 has another triangular notch 706 diametrically-opposite from the triangular notch 706.

Other shapes and configuration (e.g., geometries) of additional notches (other than the sine notches) can be used. For example, an additional notch can comprise a first portion have a first depth followed by, or contiguous to, a second portion have a second depth. Each portion may have a different geometric shape.

In another example, the additional notches (other than the sine notches) are not shaped similarly. For instance, the shape of the additional notches of the same annular metering land may differ (e.g., one notch is generally square, while another is generally triangular). In one example, the additional notches can be same on one metering land, but differ from additional notches of another metering land.

Further, although the four annular metering lands of the spools 128, 700 are configured in the same manner, in other example implementations, not all metering lands are configured similarly. For example, at least one metering land may be configured to have sine notches and additional notches to achieve a linear flow gain, while other metering lands are not configured in that manner.

Figure 8:
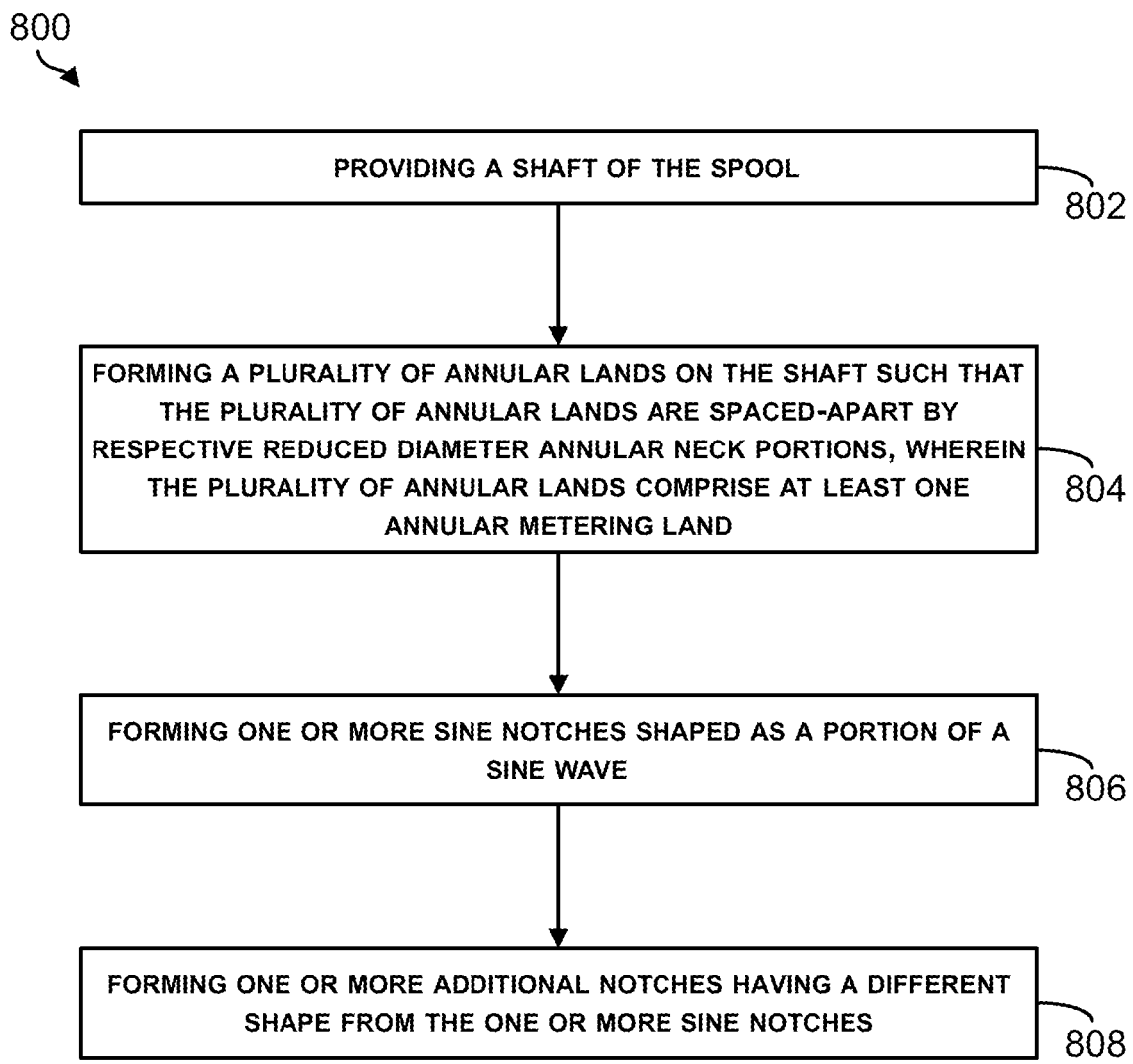
FIG. 8 is a flowchart of a method for making a spool of a valve, in accordance with an example implementation.

FIG. 8 is a flowchart of a method 800 for making a spool of a valve, in accordance with an example implementation. For example, the method 800 can be implemented to make the spool 128 or the spool 700.

The method 800 may include one or more operations, or actions as illustrated by one or more of blocks 802-808. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 802, the method 800 includes providing a shaft (e.g., the shaft 200) of the spool (e.g., the spool 128, 500, 600, 700).

At block 804, the method 800 includes forming a plurality of annular lands on the shaft such that the plurality of annular lands are spaced-apart by respective reduced diameter annular neck portions, wherein the plurality of annular lands comprise at least one annular metering land (e.g., any of the annular metering lands 152-158, 502, 602, 702).

At block 806, the method 800 includes forming one or more sine notches shaped as a portion of a sine wave (e.g., any of the sine notches 206, 210, 216, 217).

At block 806, the method 800 includes forming one or more additional notches (e.g., the square notches 212, 214, 218, 219, 504, 604 or the triangular notch 706) having a different shape from the one or more sine notches.

The method 800 can further include any of the operations described throughout the disclosure.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a spool configured to be movable in a longitudinal bore of a valve, the spool comprising: a shaft varying in diameter along a length of the shaft; and a plurality of annular lands formed on the shaft and spaced-apart by respective reduced diameter annular neck portions, wherein the plurality of annular lands comprise at least one annular metering land, and wherein the at least one annular metering land comprises: one or more sine notches formed as a portion of a sine wave, and one or more additional notches having a different shape from the one or more sine notches.

EEE 2 is the spool of EEE 1, wherein the at least one annular metering land comprise: a first pair of opposed annular metering lands formed on the shaft and spaced-apart by a first reduced diameter annular neck portion; and a second pair of opposed annular metering lands formed on the shaft and spaced-apart by a second reduced diameter annular neck portion.

EEE 3 is the spool of EEE 2, wherein each annular metering land of the first pair and second pair of opposed annular metering lands comprise respective one or more sine notches and respective one or more additional notches having the different shape from the one or more sine notches.

EEE 4 is the spool of any of EEEs 1-3, wherein the one or more sine notches comprise two sine notches, wherein the one or more additional notches comprise two additional notches, and wherein the two sine notches and the two additional notches are disposed in a circular array about a circumference of the at least one annular metering land.

EEE 5 is the spool of EEE 4, wherein the two sine notches are interleaved with the two additional notches, such that each sine notch is circumferentially-interposed between the two additional notches.

EEE 6 is the spool of any of EEEs 1-5, wherein the one or more additional notches are formed generally as a square-shaped notch.

EEE 7 is the spool of any of EEEs 1-5, wherein the one or more additional notches are formed generally as a triangular notch.

EEE 8 is a valve comprising: a valve body having (i) a longitudinal bore, (ii) a workport passage configured to be fluidly coupled to a hydraulic actuator, and (iii) a supply cavity configured to receive fluid from a source of fluid; and a spool axially movable in the longitudinal bore between a neutral position and a shifted position, wherein the spool comprises: a shaft varying in diameter along a length of the shaft, and a plurality of annular lands formed on the shaft and spaced-apart by respective reduced diameter annular neck portions, wherein the plurality of annular lands comprise at least one annular metering land, wherein the at least one annular metering land comprises: one or more sine notches formed as a portion of a sine wave, and one or more additional notches having a different shape from the one or more sine notches, wherein as the spool moves from the neutral position to the shifted position, the one or more sine notches and the one or more additional notches engage the workport passage to allow fluid flow from the supply cavity to the workport passage.

EEE 9 is the valve of EEE 8, wherein the at least one annular metering land comprise: a first pair of opposed annular metering lands formed on the shaft and spaced-apart by a first reduced diameter annular neck portion; and a second pair of opposed annular metering lands formed on the shaft and spaced-apart by a second reduced diameter annular neck portion.

EEE 10 is the valve of EEE 9, wherein each annular metering land of the first pair and second pair of opposed annular metering lands comprise respective one or more sine notches and respective one or more additional notches having the different shape from the one or more sine notches.

EEE 11 is the valve of any of EEEs 8-10, wherein the one or more sine notches comprise two sine notches, wherein the one or more additional notches comprise two additional notches, and wherein the two sine notches and the two additional notches are disposed in a circular array about a circumference of the at least one annular metering land.

EEE 12 is the valve of EEE 11, wherein the two sine notches are interleaved with the two additional notches, such that each sine notch is circumferentially-interposed between the two additional notches.

EEE 13 is the valve of any of EEEs 8-12, wherein the one or more additional notches are formed generally as a square-shaped notch or as a triangular notch.

EEE 14 is a hydraulic system comprising: a source of fluid; a fluid reservoir; a hydraulic actuator having a first chamber and a second chamber therein; and a valve comprising: a valve body having (i) a longitudinal bore, (ii) a first workport passage fluidly coupled to the first chamber of the hydraulic actuator, (iii) a second workport passage fluidly coupled to the second chamber of the hydraulic actuator, (iv) a supply cavity fluidly coupled to the source of fluid, and (v) a return cavity fluidly coupled to the fluid reservoir, and a spool axially movable in the longitudinal bore between a neutral position and a shifted position, wherein the spool comprises: (i) a shaft varying in diameter along a length of the shaft, (ii) a first annular metering land formed on the shaft, and (iii) a second annular metering land formed on the shaft, wherein the first annular metering land and the second annular metering land each has a plurality of notches comprising: one or more sine notches formed as a portion of a sine wave, and one or more additional notches having a different shape from the one or more sine notches, wherein as the spool moves from the neutral position to the shifted position, the plurality of notches of the first annular metering land engage the first workport passage to allow fluid flow from the supply cavity to the first workport passage, and the plurality of notches of the second annular metering land engage the second workport passage to allow fluid flow from the second workport passage to the return cavity.

EEE 15 is the hydraulic system of EEE 14, wherein the shifted position is a first shifted position associated with a first direction of movement of the spool, wherein the spool further comprises a third annular metering land formed on the shaft, and a fourth annular metering land formed on the shaft, wherein the third annular metering land and the fourth annular metering land each has a plurality of notches comprising: one or more sine notches, and one or more additional notches having a different shape from the one or more sine notches, wherein as the spool moves to a second shifted position in a second direction opposite the first direction, the plurality of notches of the third annular metering land engage the second workport passage to allow fluid flow from the supply cavity to the second workport passage, and the plurality of notches of the fourth annular metering land engage the first workport passage to allow fluid flow from the first workport passage to the return cavity.

EEE 16 is the hydraulic system of any of EEEs 14-15, wherein the one or more sine notches comprise two sine notches, wherein the one or more additional notches comprise two additional notches, and wherein the two sine notches and the two additional notches are disposed in a circular array about a circumference of the at least one annular metering land.

EEE 17 is the hydraulic system of EEE 16, wherein the two sine notches are interleaved with the two additional notches, such that each sine notch is circumferentially-interposed between the two additional notches.

EEE 18 is a method for making a spool configured to be movable in a longitudinal bore of a valve, the method comprising: providing a shaft of the spool; forming a plurality of annular lands on the shaft such that the plurality of annular lands are spaced-apart by respective reduced diameter annular neck portions, wherein the plurality of annular lands comprise at least one annular metering land; forming one or more sine notches shaped as a portion of a sine wave; and forming one or more additional notches having a different shape from the one or more sine notches.

EEE 19 is the method of EEE 18, wherein forming the one or more additional notches comprises: forming the one or more additional notches generally as a square-shaped notch or as a triangular notch.

EEE 20 is the method of any of EEEs 18-19, wherein forming the plurality of annular lands comprises: forming a first pair of opposed annular metering lands on the shaft such that the first pair of opposed annular metering lands are spaced-apart by a first reduced diameter annular neck portion; and forming a second pair of opposed annular metering lands such that the second pair of opposed annular metering lands are spaced-apart by a second reduced diameter annular neck portion.

What is claimed is:

1. A spool configured to be movable in a longitudinal bore of a valve, the spool comprising:
   a shaft varying in diameter along a length of the shaft; and
   a plurality of annular lands formed on the shaft and spaced-apart by respective reduced diameter annular neck portions, wherein the plurality of annular lands comprise at least one annular metering land, and wherein the at least one annular metering land comprises:
   a plurality of sine notches, wherein the entirety of each sine notch of the plurality of sine notches is formed as a portion of a sine wave, and
   a plurality of additional notches having a different shape from the plurality of sine notches, wherein the plurality of sine notches and the plurality of additional notches are disposed in a circular array about a circumference of the at least one annular metering land, and wherein the plurality of sine notches are interleaved with the plurality of additional notches, such that each sine notch is circumferentially-interposed between two additional notches of the plurality of additional notches.

2. The spool of claim 1, wherein the at least one annular metering land comprise:

a first pair of opposed annular metering lands formed on the shaft and spaced-apart by a first reduced diameter annular neck portion; and a second pair of opposed annular metering lands formed on the shaft and spaced-apart by a second reduced diameter annular neck portion.

3. The spool of claim 2, wherein each annular metering land of the first pair and second pair of opposed annular metering lands comprise a respective plurality of sine notches and a respective plurality of additional notches having the different shape from the plurality of sine notches.

4. The spool of claim 1, wherein the plurality of sine notches comprise two sine notches, wherein the plurality of additional notches comprise two additional notches, and wherein the two sine notches and the two additional notches are disposed in a circular array about a circumference of the at least one annular metering land.

5. The spool of claim 1, wherein the plurality of additional notches are formed generally as a square-shaped notch.

6. The spool of claim 1, wherein the plurality of additional notches are formed generally as a triangular notch.

7. A valve comprising:

a valve body having (i) a longitudinal bore, (ii) a workport passage configured to be fluidly coupled to a hydraulic actuator, and (iii) a supply cavity configured to receive fluid from a source of fluid; and a spool axially movable in the longitudinal bore between a neutral position and a shifted position, wherein the spool comprises:

a shaft varying in diameter along a length of the shaft, and a plurality of annular lands formed on the shaft and spaced-apart by respective reduced diameter annular neck portions, wherein the plurality of annular lands comprise at least one annular metering land, wherein the at least one annular metering land comprises: a plurality of sine notches, wherein the entirety of each sine notch of the plurality of sine notches is formed as a portion of a sine wave, and a plurality of additional notches having a different shape from the plurality of sine notches, wherein the plurality of sine notches and the plurality of additional notches are disposed in a circular array about a circumference of the at least one annular metering land, and wherein the plurality of sine notches are interleaved with the plurality of additional notches, such that each sine notch is circumferentially-interposed between two additional notches, and wherein as the spool moves from the neutral position to the shifted position, the plurality of sine notches and the plurality of additional notches engage the workport passage to allow fluid flow from the supply cavity to the workport passage.

8. The valve of claim 7, wherein the at least one annular metering land comprise:

a first pair of opposed annular metering lands formed on the shaft and spaced-apart by a first reduced diameter annular neck portion; and a second pair of opposed annular metering lands formed on the shaft and spaced-apart by a second reduced diameter annular neck portion.

9. The valve of claim 8, wherein each annular metering land of the first pair and second pair of opposed annular metering lands comprise a respective plurality of sine notches and a respective plurality of additional notches having the different shape from the plurality of sine notches.

10. The valve of claim 7, wherein the plurality of sine notches comprise two sine notches, wherein the plurality of additional notches comprise two additional notches, and wherein the two sine notches and the two additional notches are disposed in a circular array about a circumference of the at least one annular metering land.

11. The valve of claim 7, wherein the plurality of additional notches are formed generally as a square-shaped notch or as a triangular notch.

12. A hydraulic system comprising:

a source of fluid;

a fluid reservoir;

a hydraulic actuator having a first chamber and a second chamber therein; and a valve comprising:

a valve body having (i) a longitudinal bore, (ii) a first workport passage fluidly coupled to the first chamber of the hydraulic actuator, (iii) a second workport passage fluidly coupled to the second chamber of the hydraulic actuator, (iv) a supply cavity fluidly coupled to the source of fluid, and (v) a return cavity fluidly coupled to the fluid reservoir, and a spool axially movable in the longitudinal bore between a neutral position and a shifted position, wherein the spool comprises: (i) a shaft varying in diameter along a length of the shaft, (ii) a first annular metering land formed on the shaft, and (iii) a second annular metering land formed on the shaft, wherein the first annular metering land and the second annular metering land each has a plurality of notches comprising: a plurality of sine notches, wherein the entirety of each sine notch of the plurality of sine notches is formed as a portion of a sine wave, and a plurality of additional notches having a different shape from the plurality of sine notches, wherein the plurality of sine notches and the plurality of additional notches are disposed in a circular array about a circumference of the at least one annular metering land, and wherein the plurality of sine notches are interleaved with the plurality of additional notches, such that each sine notch is circumferentially-interposed between two additional notches, and wherein as the spool moves from the neutral position to the shifted position, the plurality of notches of the first annular metering land engage the first workport passage to allow fluid flow from the supply cavity to the first workport passage, and the plurality of notches of the second annular metering land engage the second workport passage to allow fluid flow from the second workport passage to the return cavity.

13. The hydraulic system of claim 12, wherein the shifted position is a first shifted position associated with a first direction of movement of the spool, wherein the spool further comprises a third annular metering land formed on the shaft, and a fourth annular metering land formed on the shaft, wherein the third annular metering land and the fourth annular metering land each has a plurality of notches comprising: a respective plurality of sine notches, and a respective plurality of additional notches having a different shape from the respective plurality of sine notches, wherein as the spool moves to a second shifted position in a second direction opposite the first direction, the plurality of notches of the third annular metering land engage the second workport passage to allow fluid flow from the supply cavity to the second workport passage, and the plurality of notches of the fourth annular metering land engage the first workport passage to allow fluid flow from the first workport passage to the return cavity.

14. The hydraulic system of claim 12, wherein the plurality of sine notches comprise two sine notches, wherein the plurality of additional notches comprise two additional notches, and wherein the two sine notches and the two additional notches are disposed in a circular array about a circumference of the at least one annular metering land.

15. A method for making a spool configured to be movable in a longitudinal bore of a valve, the method comprising:
    providing a shaft of the spool; and
    forming a plurality of annular lands on the shaft such that the plurality of annular lands are spaced-apart by respective reduced diameter annular neck portions, wherein the plurality of annular lands comprise at least one annular metering land;
    forming a plurality of sine notches, wherein the entirety of each sine notch of the plurality of sine notches is shaped as a portion of a sine wave; and
    forming a plurality of additional notches having a different shape from the plurality of sine notches, wherein the plurality of sine notches and the plurality of additional notches are disposed in a circular array about a circumference of the at least one annular metering land, and wherein the plurality of sine notches are interleaved with the plurality of additional notches, such that each sine notch is circumferentially-interposed between two additional notches.

16. The method of claim 15, wherein forming the plurality of additional notches comprises:
    forming the plurality of additional notches generally as a square-shaped notch or as a triangular notch.

17. The method of claim 15, wherein forming the plurality of annular lands comprises:
    forming a first pair of opposed annular metering lands on the shaft such that the first pair of opposed annular metering lands are spaced-apart by a first reduced diameter annular neck portion; and
    forming a second pair of opposed annular metering lands such that the second pair of opposed annular metering lands are spaced-apart by a second reduced diameter annular neck portion.

* * * * *